US007594679B1

(12) United States Patent
Schneider

(10) Patent No.: US 7,594,679 B1
(45) Date of Patent: Sep. 29, 2009

(54) OUTRIGGER FOR A BOOM TRUCK OR THE LIKE

(75) Inventor: William D. Schneider, Malcolm, NE (US)

(73) Assignee: Westchester Captial, LLC, Omaha, NE (US)

( * ) Notice: Subject to any disclaimer, the term of this patent is extended or adjusted under 35 U.S.C. 154(b) by 182 days.

(21) Appl. No.: 11/893,425

(22) Filed: Aug. 16, 2007

Related U.S. Application Data

(60) Continuation-in-part of application No. 11/521,332, filed on Sep. 14, 2006, now Pat. No. 7,331,607, which is a division of application No. 11/038,338, filed on Jan. 19, 2005, now Pat. No. 7,150,472.

(60) Provisional application No. 60/844,219, filed on Sep. 13, 2006.

(51) Int. Cl.
*B60S 9/02* (2006.01)

(52) U.S. Cl. .............. 280/766.1; 280/763.1; 280/764.1; 280/765.1

(58) Field of Classification Search .............. 280/763.1, 280/764.1, 765.1, 766.1, 6.15, 6.153–6.156
See application file for complete search history.

(56) References Cited

U.S. PATENT DOCUMENTS 3,262,582 A * 7/1966 Pitman et al. ............ 280/765.1
3,310,181 A * 3/1967 Symmank ................ 280/764.1
3,630,544 A * 12/1971 Grisham et al. .......... 280/764.1
3,716,252 A * 2/1973 Johnson .................... 280/766.1
3,826,450 A * 7/1974 Currey et al. ........... 244/103 R
3,918,741 A * 11/1975 Olson et al. .............. 280/764.1
3,977,531 A * 8/1976 Brewer ....................... 212/300
4,084,777 A * 4/1978 Lambert .................. 248/287.1
4,266,627 A * 5/1981 Lauber ....................... 180/8.3
4,383,617 A * 5/1983 Hychalk ..................... 212/304
4,424,985 A * 1/1984 Holmes ................... 280/766.1
4,558,758 A * 12/1985 Littman et al. ............... 180/8.1
4,941,546 A * 7/1990 Nist et al. ...................... 182/17
4,949,808 A * 8/1990 Garnett ........................ 182/17
5,067,739 A * 11/1991 Kuan .......................... 280/304
5,387,071 A * 2/1995 Pinkston ..................... 414/563
5,706,960 A * 1/1998 Pitman et al. ............... 212/304
6,257,619 B1 * 7/2001 Bender et al. ............ 280/764.1
6,390,504 B1 * 5/2002 Fetzer ..................... 280/763.1
6,443,490 B2 * 9/2002 Webb ...................... 280/765.1
6,811,161 B1 * 11/2004 Anderson ....................... 280/4
7,150,472 B1 * 12/2006 Schneider ................ 280/766.1

* cited by examiner

*Primary Examiner*—Christopher P Ellis
*Assistant Examiner*—Vaughn T Coolman
(74) *Attorney, Agent, or Firm*—Dennis L. Thomte; Thomte Patent Law Office LLC

(57) ABSTRACT

A three-section outrigger for a boom truck or the like which may be pivotally moved with respect to the boom truck so that the outrigger may be extended outwardly, forwardly and downwardly with respect to the boom truck to eliminate the need for an outrigger at the front end of the boom truck.

1 Claim, 6 Drawing Sheets

OUTRIGGER FOR A BOOM TRUCK OR THE LIKE

CROSS-REFERENCE TO RELATED APPLICATION

This application claims the benefit of U.S. Provisional Application Ser. No. 60/844,219 entitled "OUTRIGGER FOR A BOOM TRUCK OR THE LIKE" filed Sep. 13, 2006, the disclosure of which is hereby incorporated herein by reference. This is a continuation-in-part application of application Ser. No. 11/521,332 filed Sep. 14, 2006, entitled "DUAL MODE OUTRIGGER FOR A BOOM TRUCK OR THE LIKE" which is a divisional application of application Ser. No. 11/038,338 filed Jan. 19, 2005, entitled "DUAL MODE OUTRIGGER FOR A BOOM TRUCK OR THE LIKE" (now U.S. Pat. No. 7,150,472).

BACKGROUND OF THE INVENTION

1. Field of the Invention

This invention relates to an outrigger for a boom truck or the like and more particularly to an outrigger for a boom truck or the like which may be extended outwardly, forwardly and downwardly from one side of a boom truck or the like.

2. Description of the Related Art

In applicant's U.S. Pat. No. 7,150,472 entitled "DUAL MODE OUTRIGGER FOR A BOOM TRUCK OR THE LIKE", the disclosure of which is incorporated herein by reference thereto, a pair of outriggers of the A-frame type are disclosed, each of which may be extended outwardly and downwardly from one side of the truck or which may be extended downwardly at one side of the truck. Although the dual mode outrigger of U.S. Pat. No. 7,150,472 is meeting with success, the applicant herein is desirous of providing an A-frame outrigger of either the single or dual mode which may be extended outwardly, forwardly and downwardly from the side of the truck to eliminate the need for an outrigger at the front end of the truck. One might think that the same would be easily accomplished by simply pivotally connecting the inner end of the outrigger, about a vertical axis, to the truck. If the outrigger is simply pivoted to the truck, the outer end of the outrigger, in its deployed or extended position, will not be located sufficiently laterally distant from the side of the truck thereby reducing the stability of the truck. The next logical thing that a designer may do to solve the problem is to simply lengthen the outrigger to place the outer end thereof sufficiently distant from the truck to achieve the necessary stability for the truck. However, simply lengthening the outrigger is not possible due to the necessity of having adequate space adjacent the truck to store the outrigger in its inoperative or stored position.

SUMMARY OF THE INVENTION

An A-frame outrigger for a boom truck or the like is disclosed which normally will be mounted at each side of the truck. The inner end of the outrigger is pivotally secured, about a vertical axis and a horizontal axis, to the boom truck so that the outrigger, when extended, may be extended outwardly, downwardly and forwardly with respect thereto. The outrigger includes an inner tubular section, an intermediate tubular section which slidably embraces the inner tubular section, and an outer tubular section which slidably embraces the intermediate section. A pivotal ground engaging shoe is provided at the outer end of the outer tubular section.

A two-stage hydraulic cylinder is positioned within the tubular sections and has its base end connected to the inner end of the inner tubular section. The rod end of the hydraulic cylinder is connected to the outer end of the outer tubular section. A pair of cables are secured to the outer end of the rod end or the outer end of the outer tubular section. The cables extend inwardly through the interiors of the outer tubular section and the intermediate tubular section and extend around a pair of pulleys or sheaves which are rotatably secured to the inner interior end of the intermediate tubular section with the ends of the cables being secured to the outer end of the inner tubular section. The cables may be replaced with a hydraulic proportioning system.

Upon extension of the hydraulic cylinder, the intermediate and outer tubular sections are extended simultaneously due to the action of the two-stage hydraulic cylinder and the cable connections. Upon retraction of the hydraulic cylinder, the intermediate and outer tubular sections are retracted simultaneously. The extended outrigger may have its outer end positioned outwardly, downwardly and forwardly with respect to its inner end so that there is no need for an outrigger at the forward end of the truck.

It is therefore a principal object of the invention to provide an outrigger for a boom truck or the like.

A further object of the invention is to provide an improved outrigger for a boom truck or the like which may be extended outwardly, forwardly and downwardly from one side of a boom truck or the like.

A further object of the invention is to provide an outrigger for a boom truck wherein the outrigger utilizes three tubular sections and a two-stage hydraulic cylinder for extending and retracting the tubular members.

Yet another object of the invention is to provide an outrigger for a boom truck or the like which eliminates the need for a front jack or outrigger secured to the front end of the truck.

These and other objects will be apparent to those skilled in the art.

BRIEF DESCRIPTION OF THE DRAWINGS

FIG. 1 is a top view of the outrigger of this invention extending outwardly, forwardly and downwardly from the right side of the boom truck or the like;

DETAILED DESCRIPTION OF THE INVENTION

Figure 1:
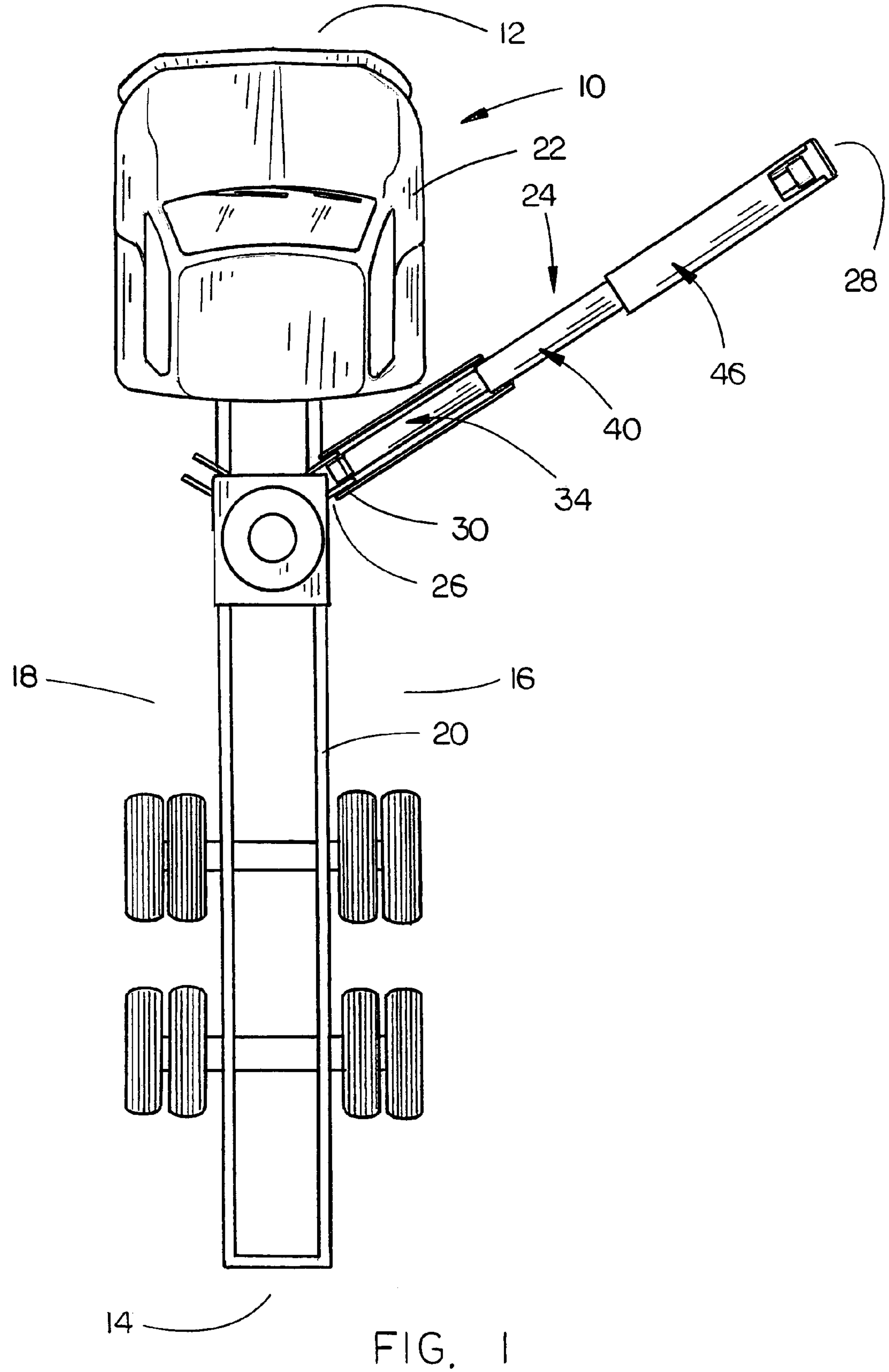

In the drawings, the numeral 10 refers to a boom truck or the like such as the truck disclosed in U.S. Pat. No. 7,150,472 entitled "DUAL MODE OUTRIGGER FOR A BOOM TRUCK OR THE LIKE". Although the outrigger of this invention is ideally suited for use as a dual mode outrigger, the outrigger of this invention may be used as a single mode outrigger if so desired.

For purposes of description, the boom truck 10 will be described as having a forward end 12, a rearward end 14, and opposite sides 16 and 18. A frame 20 extends rearwardly from the cab 22 in conventional fashion.

Figure 3:
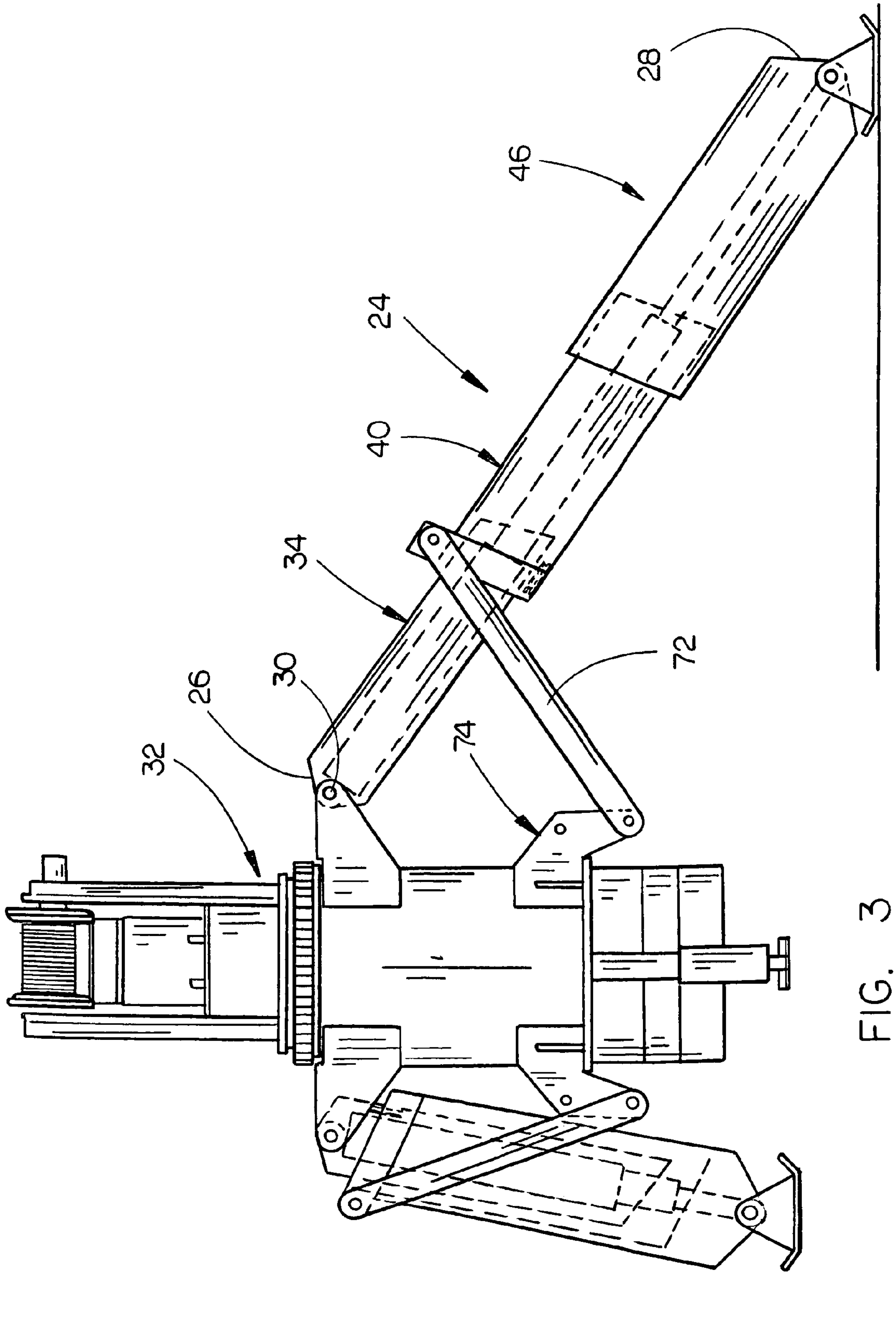
FIG. 3 is a rear elevational view illustrating one outrigger of this invention extending laterally from the right side of the boom truck or the like, and a second outrigger at the other side of the boom truck in a retracted position.
Figure 4:
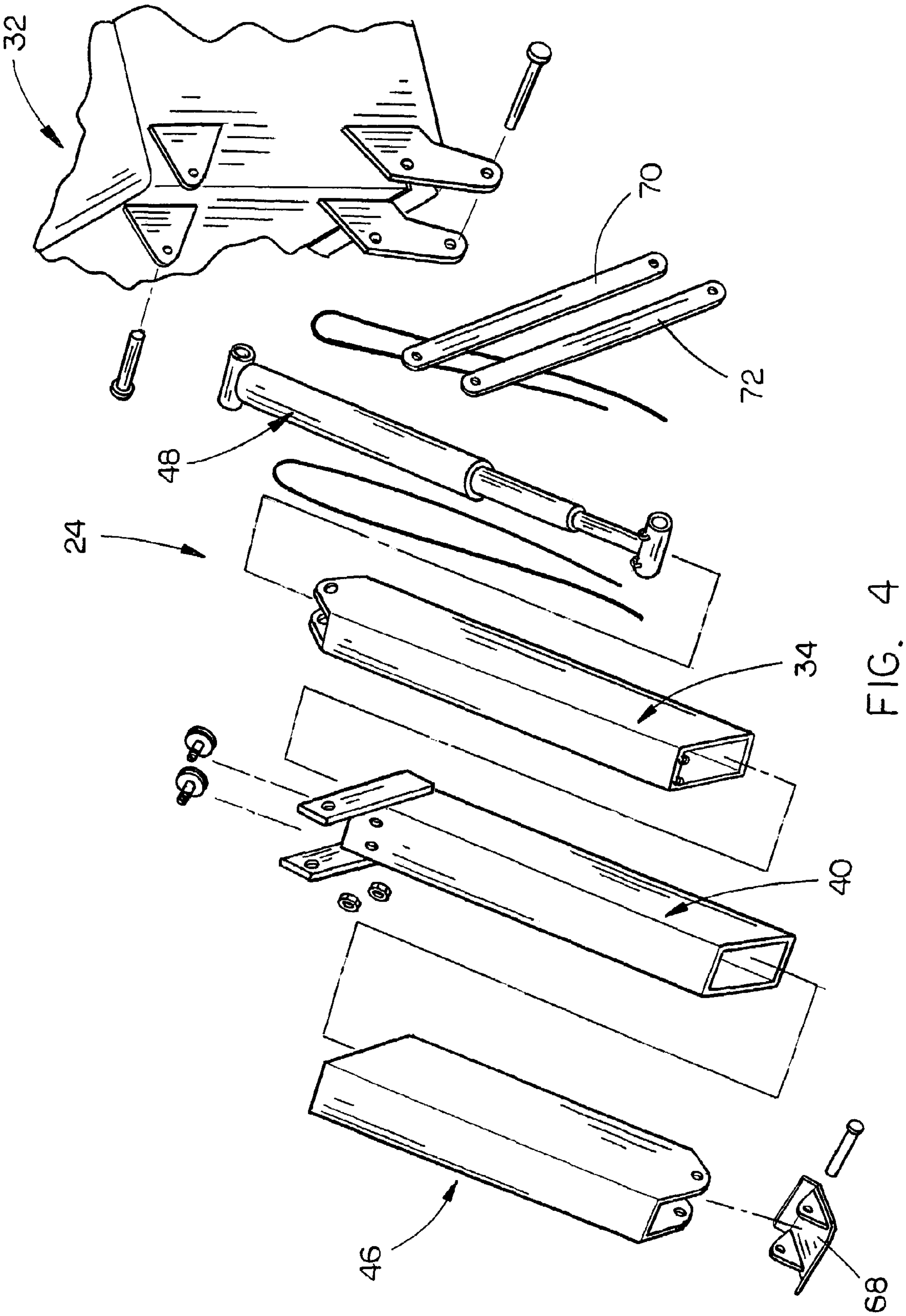
FIG. 4 is an exploded perspective view of the outrigger.

The outrigger of this invention is generally referred to by the reference numeral 24 and has an inner end 26 and an outer end 28. The inner end 26 of outrigger 24 is pivotally secured to either side of the frame 20 about a vertical axis in a conventional fashion and by a horizontal axis referred to by the reference numeral 30. In some situations such as illustrated in FIG. 3, the inner end of the boom 24 may be secured to a pedestal, turret or support 32 about a horizontal axis with the turret or support 32 being rotatable about a vertical axis. A conventional hydraulic cylinder (not shown) extends between the outrigger and the truck frame or the like for raising and lowering the outrigger 24 about a horizontal axis.

The outrigger 24 includes an inner section or tubular section 34 which is pivotally secured to the truck either about a horizontal axis and/or a vertical axis. Outrigger 24 also includes an intermediate outrigger section 40 which slidably embraces outrigger section 38 and which has an upper end 42 and a lower end 44. Outrigger 24 also includes an outer tubular section 46 which slidably embraces outrigger section 40.

Figure 5:
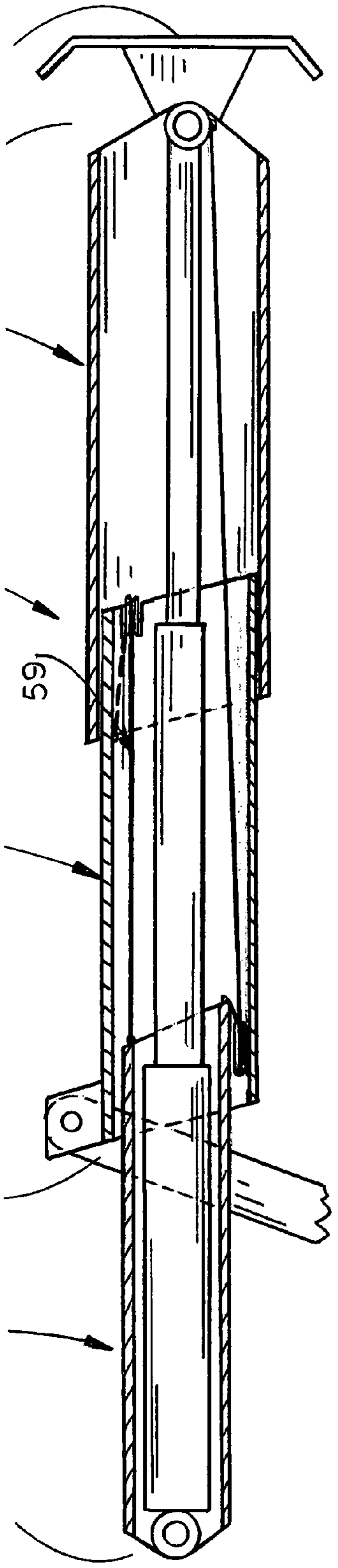
FIG. 5 is a sectional view of the outrigger in an extended position.
Figure 6:
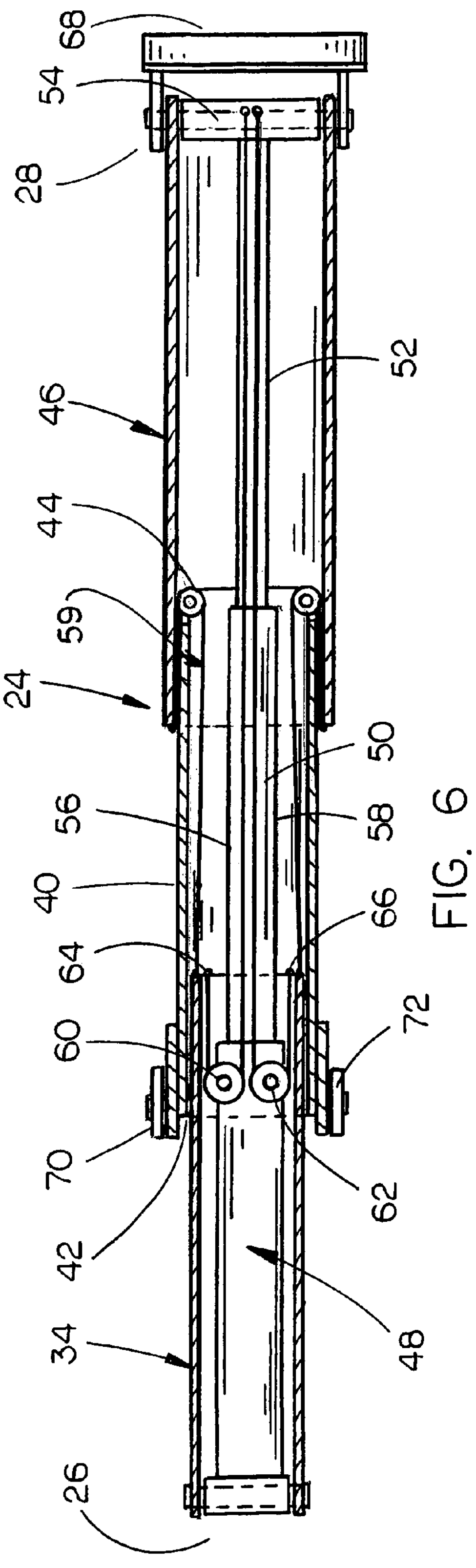
FIG. 6 is a sectional view of the outrigger in an extended position transversely to FIG. 5.
Figure 7:
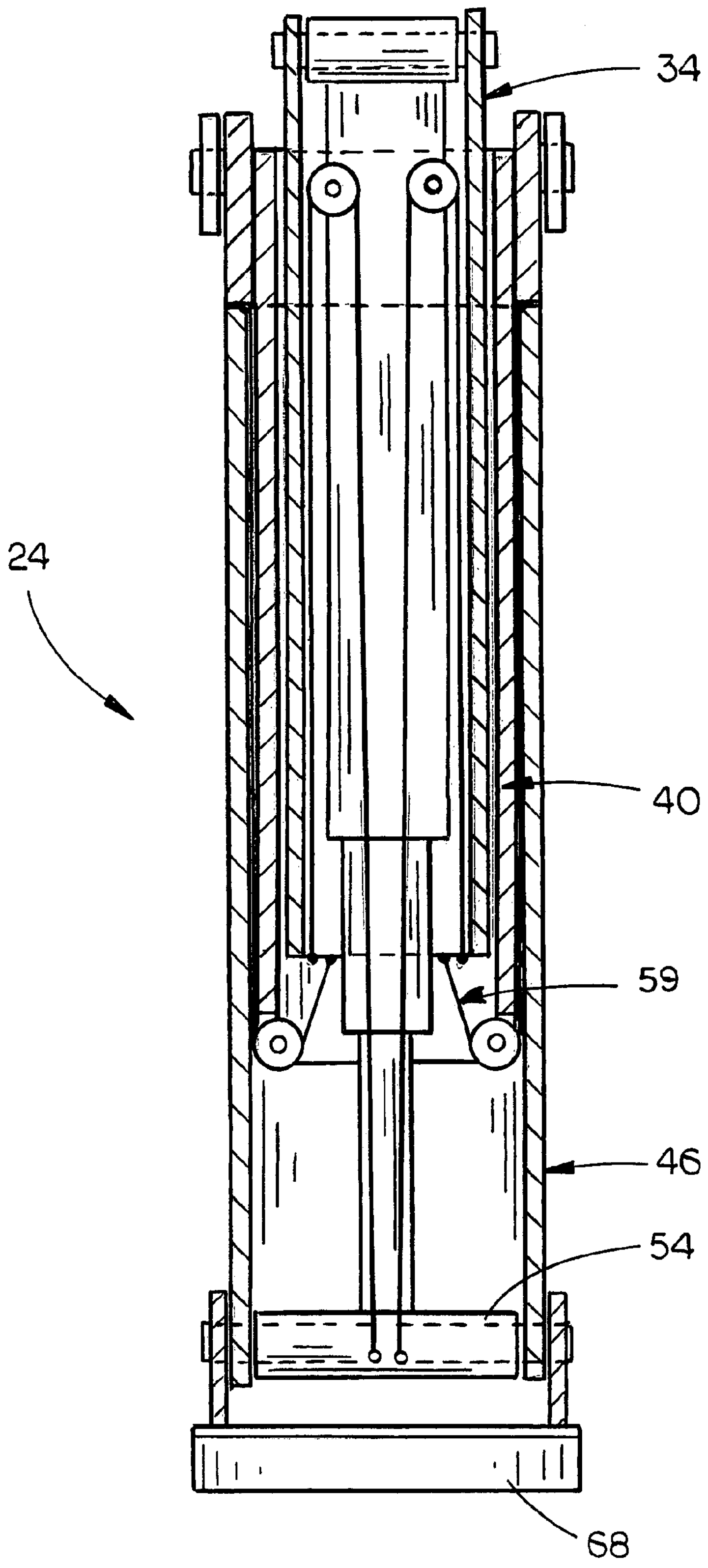
FIG. 7 is a sectional view of the outrigger in a retracted position.

A two-stage hydraulic cylinder 48 has its base end secured to a trunion or the pivot point 36 and includes cylinder portions or rod portions 50 and 52. Cylinder 48 is a double acting cylinder in that it may be extended and retracted by hydraulic pressure with the truck 10 providing the suitable hydraulic pressure. The outer end of rod 52 is connected to a trunion 54 or the like which is secured to the outer end of outrigger section 46. A pair of cables 56 and 58 are connected to the trunion or the like 54 and extend inwardly therefrom and pass around a pair of pulleys or spools 60 and 62 which are rotatably secured to the inside surface of outrigger section 40. The ends of cables 56 and 58 are secured to the outer end of outrigger section 38 at 64 and 66, respectively. Although cables are shown, the cables could be replaced by a conventional hydraulic proportioning system. The reason for utilizing the cables 56 and 58 or a hydraulic proportioning system of conventional design is to ensure that the rod portions 50 and 52 cause the tubular sections 40 and 46 to extend in unison. If the cables 56 and 58 or a hydraulic proportioning system is not used, the outer tubular section 46 will normally extend first which will drive the foot 68 into ground engagement before any pivoting of the outrigger is possible. The numeral 59 refers to a cable system illustrated in FIGS. 5-7 which ensures that the tubular sections 40 and 46 will be retracted in unison. The ground engaging foot 68 is pivotally secured to the outer end of outrigger section 46 in conventional fashion. A pair of elongated links 70 and 72 pivotally connect the inner end of tubular section 40 to a bracket assembly 74 fixed to the vehicle.

Figure 2:
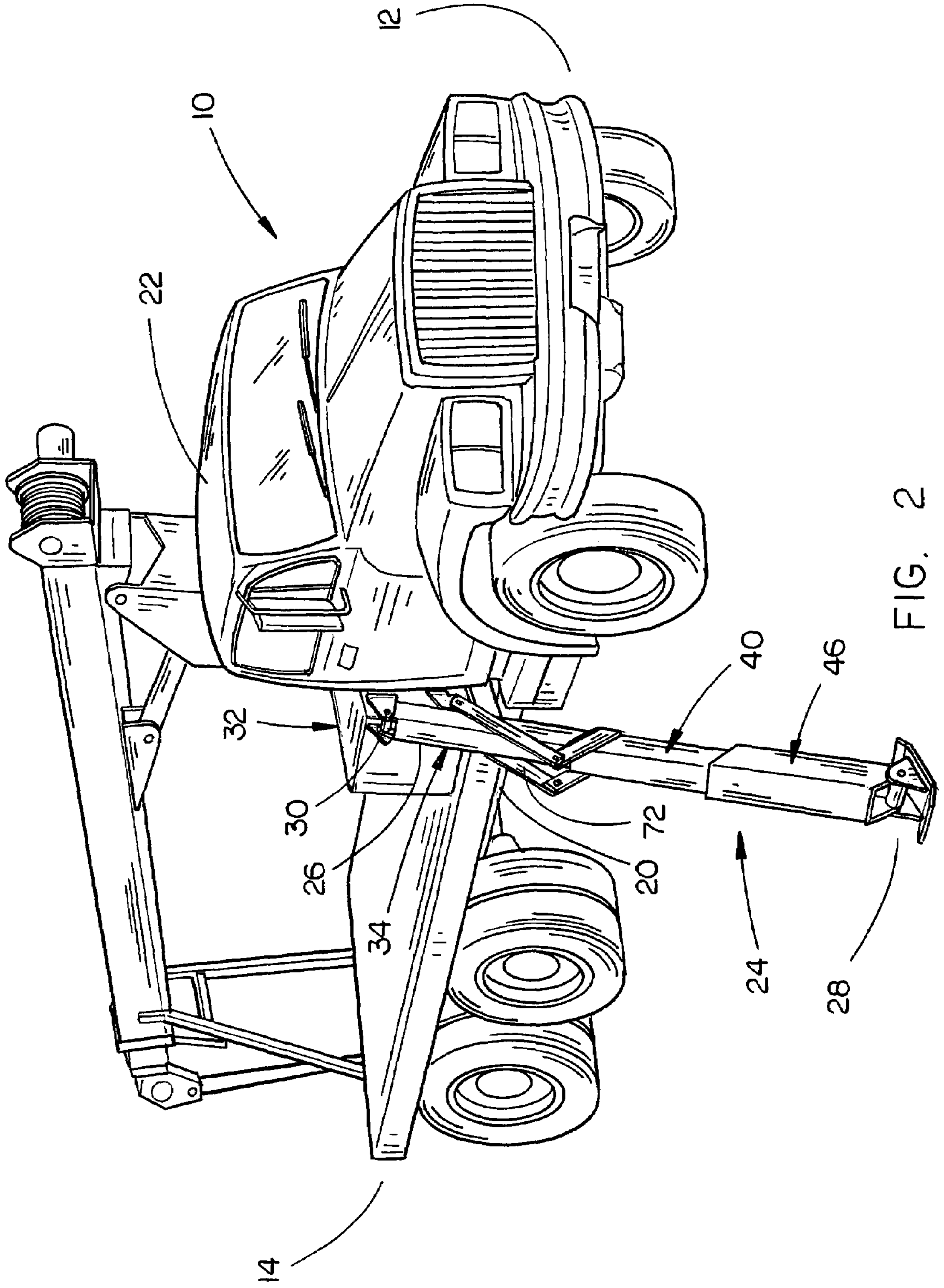
FIG. 2 is a front perspective view of the embodiment of FIG. 1.

In operation, if the outrigger 24 is to extend outwardly, forwardly and downwardly from the truck, as illustrated in FIGS. 1 and 2, the retracted outrigger 24 is swung to that desired position about the vertical axis. Hydraulic cylinder 48 is then extended, which causes the rod portions 50 and 52 to extend therefrom in unison which causes outrigger section 46 and outrigger section 40 to be moved outwardly in unison with respect to the outrigger section due to the pivotal connection of the outrigger to a fixed support by the elongated links 70 and 72. As outrigger section 46 moves outwardly, the cables 56 and 58, by passing over the pulleys 60 and 62, cause the outrigger section 40 to be pulled outwardly in unison with the outrigger section 46 which causes the outrigger to pivotally move with respect to the vehicle so as to swing outwardly from the vehicle thereby preventing the foot 68 from coming into ground engagement until the desired position of the outrigger is reached. Additional cables will ordinarily be used to cause the outrigger section 40 to be pulled inwardly in unison with the outrigger 46. The conventional hydraulic cylinder which extends between the inner tubular section 34 and the truck frame or boom frame enables the outer end of the outrigger to be raised and lowered. Thus, the three-section outrigger enables the outer end of the outrigger to be spaced sufficiently laterally of the vehicle and forwardly with respect to the vehicle so that a front outrigger is not required, as illustrated in FIGS. 1 and 2. By utilizing the three-section outrigger, the outrigger in its stowed position will not occupy an objectionable amount of space, as seen on the left side of FIG. 3.

Thus it can be seen that the invention accomplishes at least all of its stated objectives.

I claim:

1. A multi-stage outrigger for a vehicle having opposite sides, comprising:

an inner tubular member having inner and outer ends;

said inner end of said inner tubular member being operatively pivotally secured to the vehicle;

an intermediate tubular member, having inner and outer ends, slidably embracing said inner tubular member;

an elongated linkage means pivotally connected to and extending between the vehicle and said intermediate tubular member;

an outer tubular member, having inner and outer ends, slidably embracing said intermediate tubular member;

a multi-stage hydraulic cylinder positioned with the outrigger having a base end secured to said inner tubular member;

said multi-stage hydraulic cylinder having inner and outer telescoping rods with the outer rod having a rod end;

said rod end of said outer rod being secured to said outer tubular section;

said hydraulic cylinder, upon being extended, causing said inner, intermediate and outer tubular members to swing outwardly from the vehicle and causing said intermediate tubular member and said outer tubular member to slidably move together in unison outwardly relative to said inner tubular member;

the pivotal connection of said inner tubular member permitting the outrigger to be extended outwardly, forwardly and downwardly with respect to the vehicle.

* * * * *